Feb. 8, 1949. M. L. SWEAT 2,460,857
OPERATING TABLE
Filed April 26, 1944
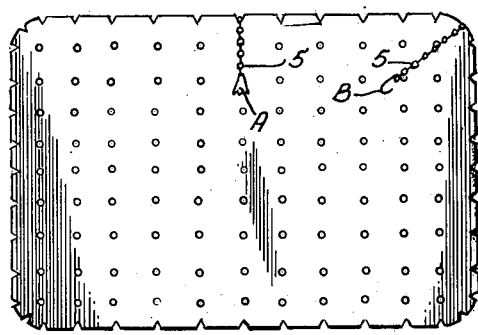
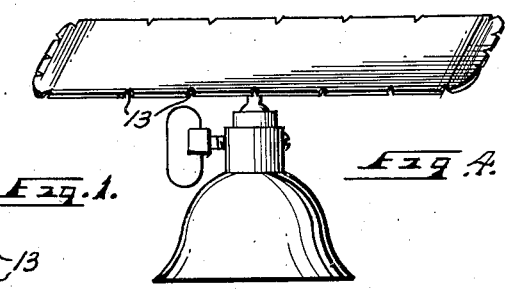
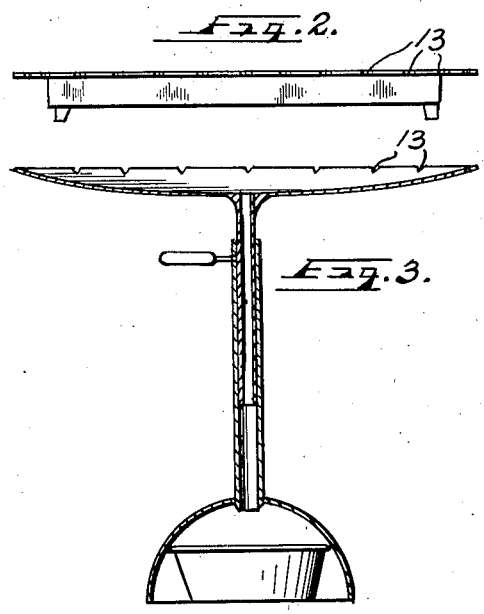
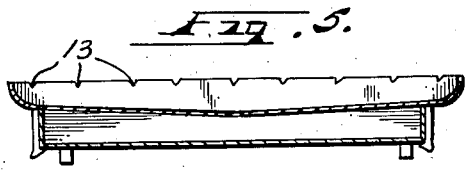
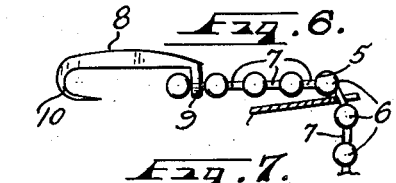
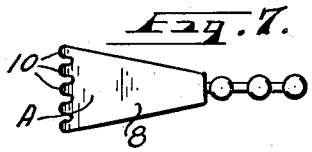
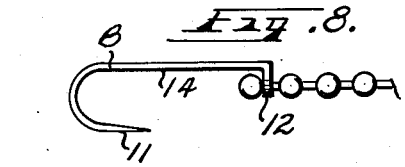
Inventor
Max L. Sweat
By R. M. Thomas
Attorney Patented Feb. 8, 1949

2,460,857

UNITED STATES PATENT OFFICE 2,460,857

OPERATING TABLE

Max L. Sweat, Salt Lake City, Utah

Application April 26, 1944, Serial No. 532,854

1 Claim. (Cl. 119—103)

My invention relates to dissecting or operating tables and has for its object to provide a new and highly efficient table of the class set out which is highly, easily and quickly utilized and which meets all the demands for such a table.

A further object is to provide a new means for holding the animal in position while being operated upon or during dissecting or operating and which utilizes a simplified, economical structure, easily adjusted and one which may be completely sterilized after each use, being made entirely of metal or baked enamel ware.

A still further object is to provide a new method of holding animals or carcasses on a table which when utilized will hold the body in fixed position throughout the operation.

These and other objects I accomplish with the device illustrated in the accompanying drawings in which similar numerals and letters of reference indicate like parts throughout the several views and as described in the appended claim.

In the drawings in which I have shown my invention,

Figure 1 is a plan view of a table top showing the holding means.

Figure 2 is a side elevation of Figure 1.

Figure 3 shows a vertical section through a table and stand wherein the stand is adjustable as to height and catches all drainage from the operating table.

Figure 4 shows a modified type of table used for small dissecting jobs such as mice and the like.

Figure 5 is a longitudinal section through a modified table top.

Figure 6 is a side elevation of the holding claw used for body gripping.

Figure 7 is a plan view of Figure 6.

Figure 8 is a side elevation of a limb engaging hook.

In the drawings I have shown several modifications as to the type of table used but the main essential feature of my invention resides in the manner in which the perimeter of the table is cut and in the link chain and gripping means for securing the body to the table.

The main features shown in Figures 6, 7 and 8 consist of a link chain often called a ball chain 5, having balls 5 and spacers 7 and one end of which is attached to a retractor A or hook B. The retractor A is made of a body 8 provided with an angled end 9 in which a hole permits the insertion of one of the spacer links of the end of the ball chain. The other end of the retractor is made wider and then is formed into curved pointed fingers 10. A plan view of the body shows it tapered to the flange end and wide at the finger end. The hook B is made in form similar to a fish hook with the barb removed from the point 11 and with the eye 12 turned down at right angles to the body 14 of the hook to engage around one of the end spacers of the ball chain.

The tables are all provided with spaced apart V-shaped grooves 13 in which the link portion of the chain is inserted to hold the body of the animal being dissected in place. The point of the hook or the fingers of the retractor are engaged with and pierce the flesh of the body and legs of the animal. If the animal is alive and operation is being performed the legs are banded by adhesive tape or the like and the hooks and retractor engaged with the tape.

Having thus described my invention, I desire to secure by Letters Patent and claim:

A dissecting table of the class described comprising a table having notches spaced apart and formed in and throughout the entire perimeter of the table; a multiplicity of sharp pointed hooks for engaging the body of the carcass being dissected to hold it in place; and a ball chain attached to each hook, the chains to be engaged in any of the notches to hold the carcass in place and at least one of the hooks serving as a retractor.

MAX L. SWEAT.

REFERENCES CITED

The following references are of record in the file of this patent:

UNITED STATES PATENTS

| Number | Name | Date |
|---|---|---|
| 201,933 | McIlroy | Apr. 2, 1878 |
| 800,794 | Connell | Oct. 3, 1905 |
| 1,380,244 | Otis | May 31, 1921 |
| 1,651,290 | Pierce | Nov. 29, 1927 |
| 1,822,206 | Ferguson | Sept. 8, 1931 |
| 2,059,957 | Mendenhall | Nov. 3, 1936 |

FOREIGN PATENTS

| Number | Country | Date |
|---|---|---|
| 79,150 | Germany | Jan. 26, 1895 |
| 704,053 | Germany | Mar. 21, 1941 |